United States Patent

Hansen

[11] Patent Number: 5,818,024
[45] Date of Patent: Oct. 6, 1998

[54] PULSE WIDTH DEMODULATION DEVICE AND METHOD

[75] Inventor: John P. Hansen, Austin, Tex.

[73] Assignee: Advanced Micro Devices, Inc., Sunnyvale, Calif.

[21] Appl. No.: 597,012

[22] Filed: Feb. 5, 1996

[51] Int. Cl.$^6$ .................................................. G06K 7/10
[52] U.S. Cl. .......................................................... 235/463
[58] Field of Search .................................. 235/462, 463, 235/472

[56] References Cited

U.S. PATENT DOCUMENTS

| | | |
|---|---|---|
| 3,619,569 | 11/1971 | Hoehn et al. . |
| 4,128,892 | 12/1978 | Vasa . |
| 4,717,818 | 1/1988 | Broockman et al. . |
| 4,768,163 | 8/1988 | Clark et al. . |

FOREIGN PATENT DOCUMENTS

| | | |
|---|---|---|
| 0 262 924 | 4/1988 | European Pat. Off. . |
| 0 427 528 | 5/1991 | European Pat. Off. . |
| 0 497 323 | 8/1992 | European Pat. Off. . |
| 40 06 184 A 1 | 8/1991 | Germany . |

OTHER PUBLICATIONS

International Search Report for PCT/US 97/01379 received Sep. 10, 1997.

*Primary Examiner*—F. L. Evans
*Attorney, Agent, or Firm*—Kevin L. Daffer; Conley, Rose & Tayon

[57] ABSTRACT

A sensor having an input and an output, wherein the output produces a signal transition whenever the sensor input traverses an indicia placed within a spaced plurality of indicia of varying widths. A logic unit is coupled to produce an interrupt signal and a timer control signal during the signal transition. A microcontroller having an interrupt control and a timer control unit is provided for processing a first timed value and compiling a second timed value upon receiving the interrupt signal and the timer control signal from the logic unit.

19 Claims, 3 Drawing Sheets

PULSE WIDTH DEMODULATION DEVICE AND METHOD

BACKGROUND OF THE INVENTION

1. Field of the Invention

The present invention relates to signal detection and more particularly to a device and method for detecting the occurrence and duration of various indicia by a programmable pulse-width demodulation technique.

2. Description of the Relevant Art

The use of microcontrollers in scanning readers is well-known. Scanning readers are used, for example, in bar code readers, infrared decoders, servo motor controllers, magnetic strip readers, and acoustic sensors. The readers serve to discern the spatial position and width of the various indicia which they are scanned across. The indicia or regions of a first polarity are separated by, or alternate with, regions of opposite polarity. Accordingly, readers can read various types of indicia which include optical-, magnetic- or sonic-detectable indicia. "Indicia" is thereby herein referred to as any spatially positioned element which can be read by a sensor as the sensor or indicia are moved relative to one another, and includes, without limitation, regions of a first polarity separated by, or alternating with, regions of a second polarity. While not limiting to all types of readable indicia, a popular optically readable indicia comprises a bar code. A bar code can be read by scanning a photo detector reader across a plurality of spatially displaced indicia of varying widths. The magnitude of each indicia width represents a code or symbol indicative of, for example, the product to which the bar code is affixed.

Scan mechanisms, and the indicia which they can read, have gained in popularity in a variety of applications, examples being in the retail/sales industry, aeronautical (servo motor control) industry, and optical storage and transmission industry. Scan mechanisms serve to detect spatially distributed regions (indicia) of alternating intensity. Typically, the sensor generates an analog voltage waveform representative of not only the spacing between indicia but also the width of each indicia spaced within a plurality of indicia. For example, a positive voltage or local maximum of the analog voltage waveform is representative of an opaque, dark, or black region (i.e., a region of a first polarity), and a negative voltage or local minimum is representative of a transparent, light, or white region (i.e., a region of a second polarity).

Typically, the analog output from the sensor is fed into an analog-to-digital (A/D) converter. The A/D converter functions to convert the local maximum and minimum values to a digital waveform containing a stream of logic ones and zeros, respectively. The digital waveform can then be readily stored in primary or secondary memories or processed by a digital signal processor. Typically, the memory medium and processor form part of a microcontroller which can be programmed to compile or process the digital waveform according to a user-defined algorithm.

While the above described system generally provides adequate performance, conventional A/D converters used in such applications do not inherently reject noise. If the analog voltage waveform contains spurious noise which triggers "false" transitions of the A/D converter, then the A/D output will note the noise and pass it to the microcontroller. In addition to its operational shortcomings, an A/D converter is by its nature relatively complex and difficult to produce on a monolithic substrate. For example, many A/D converters employ complex sample-and-hold circuitry, and introduce deleterious quantization noise. Sample-and-hold circuits require fairly accurate capacitor matching, and quantization noise must be removed by complicated digital filters in the digital signal processor.

Increasingly, there is a desire for greater device integration on a single monolithic substrate without having to contend with the complex nature of A/D circuits. A microcontroller which can directly receive an analog voltage waveform and thereafter detect (or demodulate) indicia widths read by a sensor would thereby pose an advantage over conventional devices. Moreover, it would be desirable to introduce an improved architecture which would allow a conventional microcontroller to operate either as a demodulator or as a standard purpose processor depending upon how it is programmed.

SUMMARY OF THE INVENTION

In accordance with one embodiment of the present invention, there is provided a device and method for detecting a plurality of varying width, spaced plurality of indicia. The detection device and method employs sensors for producing an analog voltage waveform responsive to their being scanned across the indicia. Output from the sensors are fed into an improved demodulator hereof which avoids the disadvantages of conventional A/D conversion. The improved demodulator includes a pulse width demodulation system which employs microcontroller control signals at transitions of the analog waveform. Thus, each time the analog waveform transitions from a local maximum or local minimum voltage, the improved device hereof initiates and/or concludes control of various interrupt and timing functions within a microcontroller. The demodulator thereby proves beneficial in achieving pulse width demodulation at times when a user selectively programs such a function. At other times, the microcontroller functions as normal without recognizing a demodulation application.

The improved demodulator advantageously triggers the interrupt and timing functions only when the analog voltage transitions past a certain percentage beyond its present state. Thus, the demodulator can reject or "filter" spurious noise introduced into the sensor output. A substantial benefit in noise rejection is to prevent occurrence of transient voltages upon input lines of the microcontroller. If the microcontroller is embodied in, for example, complementary metal oxide semiconductor ("CMOS") technology, any interim voltage would deleteriously cause direct linkage between power and ground conductors. By forcing rapid transitions through use of a properly timed bistable multivibrator, the present demodulator can minimize false noise readings and the time during which interim voltage transients occur.

The sensors are configured to read spatially displaced indicia of varying widths that are representative of desired signals. Upon reading the indicia, the sensors generate the analog voltage waveform. A logic unit is coupled between the sensor device and the microcontroller. The logic device is adapted, during use, to provide control signals responsive to level transitions of the analog waveform. The microcontroller uses the control signals to determine the widths of the spaced indicia. More specifically, the microcontroller determines from the control signals the relative widths of analog voltages which exceed, according to one embodiment, 75% of VDD value—herein referred to as pulse width high duration. The microcontroller can also determine from the control signals the relative widths of analog voltages which are less than, according to another embodiment, 25% of VDD value—herein referred to as pulse width low duration.

VDD value is defined as one which exceeds ground, and is generally referred to as a power voltage extending across the microcontroller. A suitable VDD value is either 5.0 volts or 3.3 volts.

Broadly speaking, the present invention contemplates a sensor having an input and an output, wherein the output produces a signal transition whenever the sensor input traverses an indicia placed within a spaced plurality of indicia of varying widths. A logic unit is coupled to the sensor output to produce an interrupt control signal and a timer control signal during the signal transition. A microcontroller is coupled to outputs from the logic unit such that the microcontroller is responsive to the interrupt control signal and the timer control signal. During operation, the microcontroller processes a first timed value and compiles a second timed value upon receiving the interrupt control signal and the timer control signal from the logic unit. Thus, the microcontroller can quickly perform calculations (i.e., process) the first timed value compiled during a first time interval while simultaneously recording (i.e., compile) the second timed value occurring during a second time interval subsequent to the first.

The present invention further contemplates a method for determining both high and low pulse widths during each cycle of a modulated analog signal. The modulated analog signal is provided from a sensor output, and includes several transitions between high and low voltage values. High and low voltage values are defined herein above as those which exceed a percentage of VDD or are less than a percentage of VDD. A first transition may therefore be one which occurs when the analog signal changes from a high voltage value to a low voltage value. A second transition, occurring after the first transition, takes place when the analog signal changes back to the high voltage value. A third transition, occurring after the second transition, takes place when the analog signal changes back to the low voltage value. A first time count is initiated at a moment in which the first transition occurs. When the second transition occurs, the first time count is terminated and a second time count begins. Further, when the third transition occurs, the second time count is terminated and a third time count begins. Beginning and ending of time counts is effectuated within the microcontroller during interrupts. An entire cycle width can be determined by adding the first and second time counts. From the cycle width, relative widths of low pulses and high pulses can be determined. For example, a low pulse width is determined by dividing the first time count by the cycle width, and a high pulse width is determined by dividing the second time count by the cycle width. A next cycle may be compiled and processed beginning with the time the third transition occurs.

BRIEF DESCRIPTION OF THE DRAWINGS

Other objects and advantages of the invention will become apparent upon reading the following detailed description and upon reference to the accompanying drawings in which.

Figure 1:
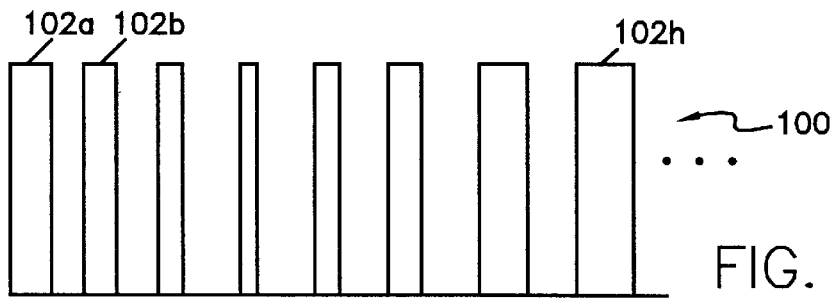
FIG. 1 is a spatial distribution of indicia which can be read by a sensor.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE INVENTION

Turning now to the drawings and with particular attention to FIG. 1, there is shown an exemplary spatial distribution 100 of indicia 102a through 102h. Of varying widths, indicia 102 are placed at regular intervals along an area to be scanned. Scanning of indicia 102 is carried forth by moving an optical, magnetic, sonic, etc., sensor 104 across distribution 100.

Figure 2:
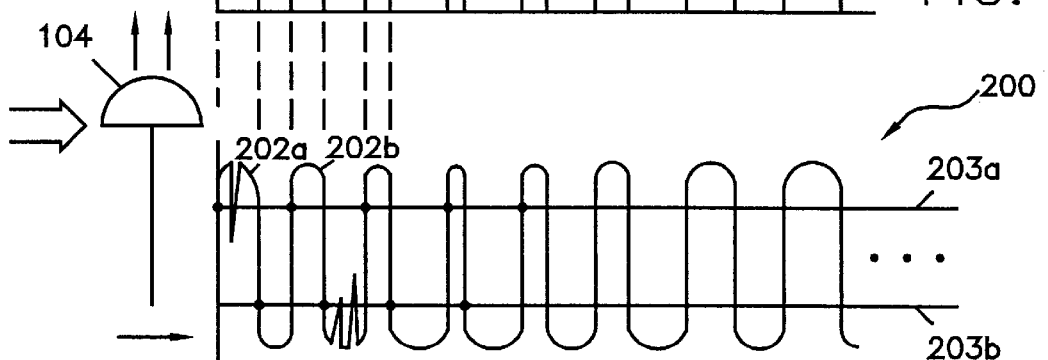
FIG. 2 is a time diagram of a sensor output signal from the sensor as a result of the sensor being scanned across the indicia.

FIG. 2 illustrates the output from sensor 104. More specifically, sensor 104 produces an analog waveform 200 having pulses 202a through 202h representing the widths of respective indicia 102a through 102h, shown in FIG. 1. If indicia 102 are optically readable indicia, then voltage magnitudes near VDD represent, e.g., opaque regions, while voltage magnitudes near ground represent, e.g., transparent regions. More generally, voltage magnitudes near VDD may represent regions of a first polarity; voltage magnitudes near ground may represent regions of a second polarity.

Figure 3:
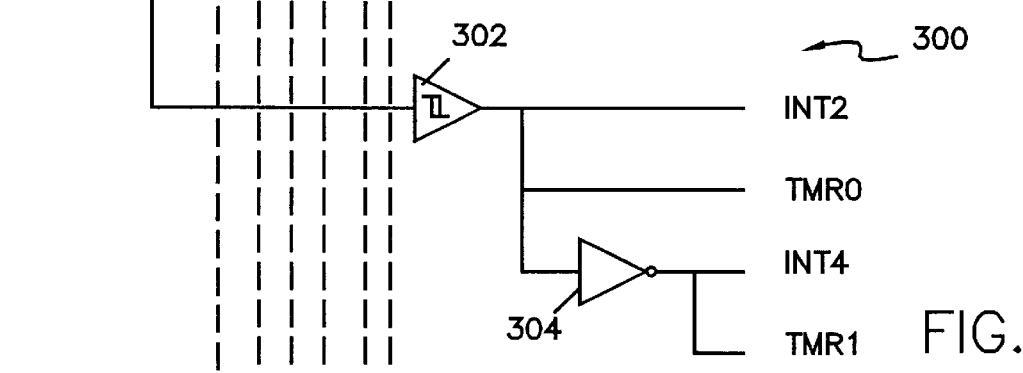
FIG. 3 is a circuit diagram of a logic unit coupled to the sensor output for receiving the sensor output signal.

Turning now to FIG. 3, there is shown a logic unit configured to detect analog waveform 200 and provide control signals for its decoding. More particularly, analog waveform 200 is input into a bistable multivibrator 302 which, according to one embodiment, is a Schmitt trigger. Multivibrator 302 switches high when it detects a voltage of 75% of the supply or reference voltage, VDD. Multivibrator 302 switches low when it detects a voltage of 25% of VDD. These threshold values are shown in FIG. 2 as lines 203a and 203b, respectively. As can be seen, any noise value occurring during a low pulse which does not exceed 75% of VDD will be rejected. Further, any noise value occurring during a high pulse which is not less than 25% of VDD will be rejected. Any noise transients in the interim will therefore not be translated on multivibrator 302 output and, accordingly, will not pass through to CMOS circuits coupled to multivibrator 302 output. The output of multivibrator 302 is provided either to external pins or internal conductors of a microcontroller, shown in FIG. 5. Output from multivibrator 302 is therefore presented as control signals placed on those pins or conductors, and illustrated in FIG. 3 as interrupt 2 (INT2) and timer 0 (TMR0) control signals. The output of multivibrator 302 is further provided to an inverter 304, the output of which is similarly provided to pins or conductors of the microcontroller as interrupt 4 (INT4) and the timer 1 (TMR1) control signals.

Figure 4:
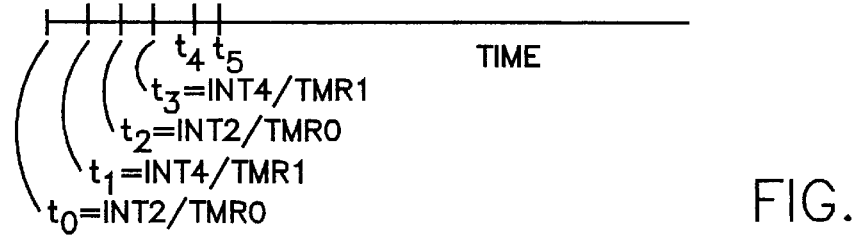
FIG. 4 is a timing diagram of particular output from the logic unit during select moments in time.

The nature of microcontroller external pins and internal conductors, and the signals received by them is best explained with reference to FIG. 4. FIG. 4 depicts a timing diagram of particular outputs from the logic unit during select moments in time. More particularly, at time $t_o$, a low-to-high transition of pulse 202a is detected. Multivibrator 302 outputs a high value to INT2 and TMR0. The detection of the low-to-high transition will activate a timer within the microcontroller (as will be discussed in greater detail below). As will become more clear below, the nature of INT2 is to generate an interrupt which will deactivate TMR1. At time $t_1$, a high-to-low transition of pulse 202a will be detected, and multivibrator 302 will output or switch low. This will generate an enable output from inverter 304 and cause activation of interrupt INT4 and also present signal TMR1. Signal INT4 serves to interrupt the microcontroller and deactivate timer 0 within the timer control unit of the microcontroller. Signal INT4 also initiates counting of another timer within the timer control unit designated as timer 1. While timer 1 is counting (i.e., recording or compiling) the time duration between $t_o$ and $t_1$, the microcontroller will process the value recorded by timer 0. A new pulse 202b is detected upon the next low-to-high transition (at $t_2$), at which time multivibrator 302 will again output high to INT2 and TMR0. Again, asserting INT2 will cause TMR1 (i.e., timer 1) to stop counting and will cause a reset TMR0 (i.e., timer 0) to begin counting. While TMR0 is counting, the previously received value at TMR0 and the most recently received value at TMR1 will be processed. The TMR1 and TMR0 counts will be added together to produce a total pulse or cycle width for pulse 202a. The TMR0 and TMR1 values may then be divided by the total cycle pulse-width value in order to determine high and low pulse widths for pulse 202a, respectively. It should be clear that, beginning at time $t_2$ pulse 202b is compiled and processed as discussed with respect to pulse 202a.

Figure 7:
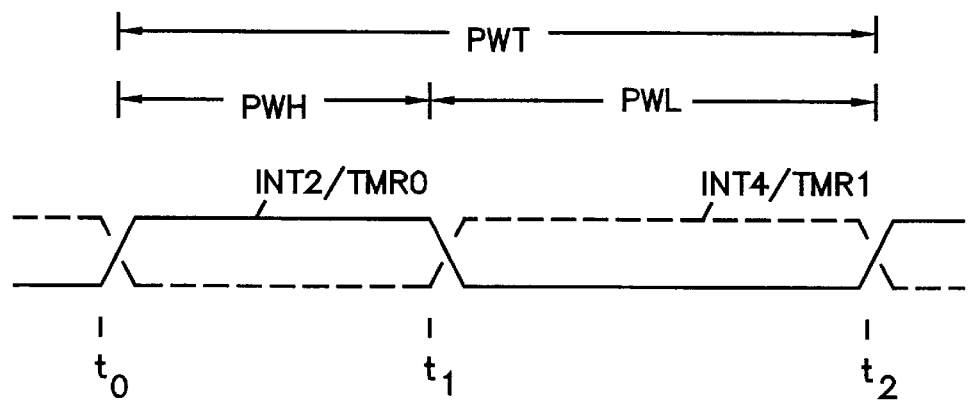
FIG. 7 is timing diagram of a signal demodulated (or detected) from the sensor output signal by the logic unit and microcontroller.

FIG. 7 represents an exemplary signal received from logic unit 300. At time to, multivibrator 302 detects the low-to-high transition of pulse 202a, and begins to output a high pulse PWH at INT2 and TMR0, activating timer 0. The output of inverter 304 is low, represented in FIG. 7 in phantom. At time $t_1$, multivibrator 302 detects the transition from high-to-low of pulse 202a, and accordingly terminates pulse PWH and transitions to PWL. Inverter 304 outputs high (represented in phantom in FIG. 7), which begins compiling timer 1, TMR1, and asserting interrupt 4, INT4, which deactivates and begins to process timer 0, TMR0. At time $t_2$, the low to high transition of the next pulse, pulse 202b, is detected, causing the multivibrator to again output a high voltage. Interrupt 2, INT2, is asserted, which causes timer 1, TMR1, to cease timing. Timer 0 is again activated to compile the duration of the next high pulse, and the value at TMR1 is processed. The previous value at TMR0 is summed with the value at TMR1, to obtain a total pulse width, PWT. PWH and PWL are then divided by PWT to obtain high and low pulse durations, respectively.

Figure 5:
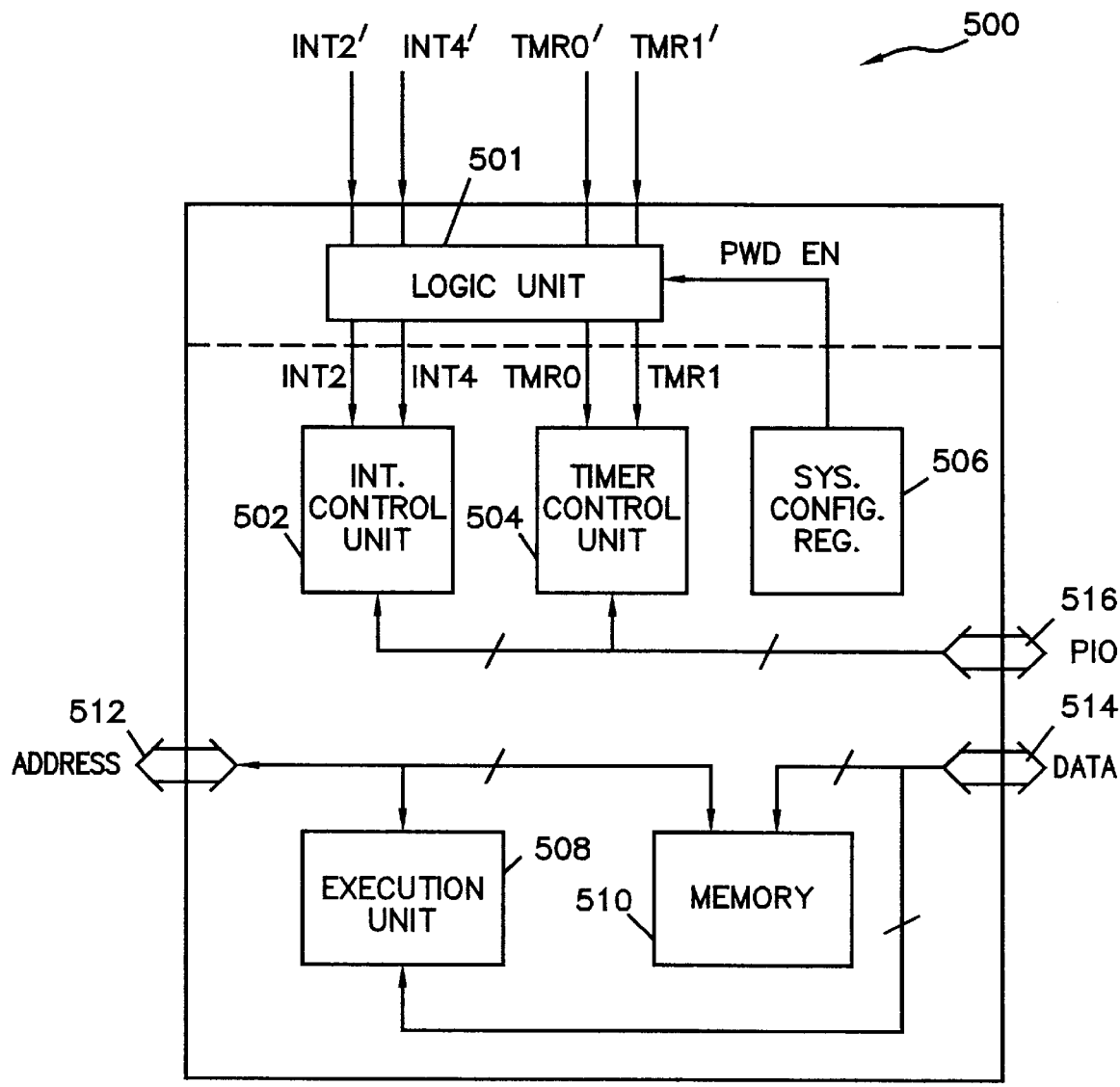
FIG. 5 is block diagram of a logic unit placed external to or as part of a retrofitted microcontroller, wherein the logic unit provides interrupt and timing control during the select moments in time.

An exemplary embodiment of a microcontroller including pulse width demodulator circuitry is shown in FIG. 5. In the embodiment shown, microcontroller 500 is an Am 186™ES or Am 188™ES, 16-bit embedded microcontroller, available from Advanced Micro Devices, Inc., Sunnyvale Calif. Microcontroller 500 includes an execution unit 508 and a memory 510, both coupled to an address bus 512 and a data bus 514. Microcontroller 500 further includes an interrupt control unit 502, a timer control unit 504, and a system configuration register 506. Interrupt control unit 502 and timer control unit 504 are each coupled to programmable input/output (PIO) bus 516. Interrupt control unit 502, timer control unit 504, and system configuration register 506 are further coupled to logic unit 501. Logic unit 501 is shown in greater detail in FIG. 6. It should be noted that while logic unit 501 is shown integrated with microcontroller 500 in FIG. 5, the logic unit 501 also may be embodied as a discrete component.

Microcontroller 500 operates in two modes. In a standard mode, the INT2', INT4' pins function as maskable interrupt requests. Pins TMR0' and TMR1' supply clock or control signals to the internal microcontroller timers 0 and 1, respectively. In the second mode of operation (the pulse width demodulation mode of operation), the INT2' pin receives and causes processing of an analog input pulse forwarded thereto. INT2' pin drives the multivibrator 302, the output of which is used internally to drive INT2 and TMR0. The output of Schmitt trigger 302 is inverted using inverter 304 and used internally to drive signals INT4 and TMR1. In pulse width demodulation mode, INT4', TMR0' and TMR1' may be used as programmable input/outputs. If they are not so used, they are ignored internally.

Selection between the standard and pulse width demodulation modes of operation is accomplished by setting a bit in the system configuration register 506. When the PWD EN bit of the system configuration register is set, pulse width demodulation is enabled. When cleared, pulse width demodulation mode is disabled. On reset, the bit is cleared.

Figure 6:
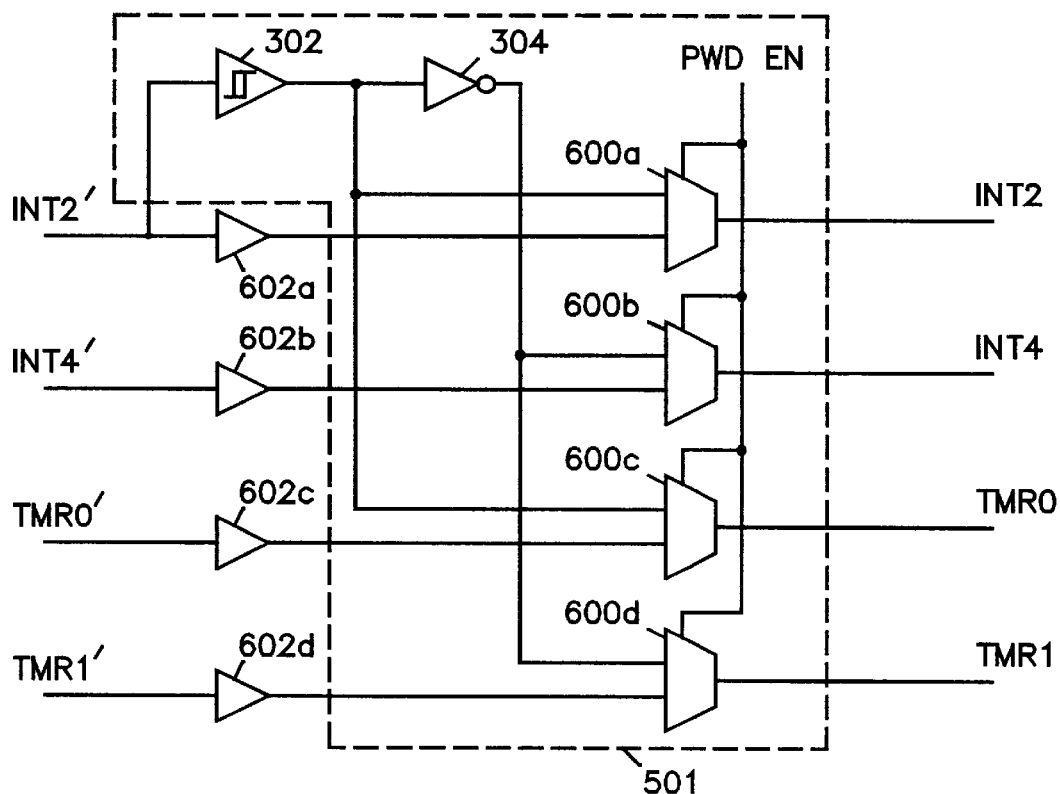
FIG. 6 is a circuit diagram of the logic unit, according to one embodiment, interposed between external pins and internal conductors of the microcontroller.

Turning now to FIG. 6, there is shown circuitry for switching between operation modes. Logic unit 501 includes multivibrator 302, coupled to inverter 304. The output of multivibrator 302 is further coupled to multiplexer 600a and 600c. The output of inverter 304 is coupled to multiplexers 600b and 600d. The input to multivibrator 302, INT2', is suitably buffered (via buffer 602) and coupled to one input of multiplexer 600a. Buffered INT4' is coupled to an input of multiplexer 60b; buffered TMR0' is coupled to an input of multiplexer 600c; and buffered TMR1' is coupled to multiplexer 600d. The outputs of the multiplexers 600a, 600b, 600c and 600d are coupled to INT2, INT4, TMR0 and TMR1, respectively. Multiplexers 600a, 600b, 600c, and 600d are controlled by the PWD EN forwarded from system configuration register 506, shown in FIG. 5.

When PWD EN is active, multiplexers 600a, 600b, 600c and 600d receive the output and the inverted output of Schmitt trigger 302 to internally drive INT2, INT4, TMR0 and TMR1. The input signal received along line INT2' is decoded as discussed above. INT4', TMR0', and TMR1' are either used as PIO's or ignored internally. When PWD EN is deactivated, Schmitt trigger 302 is bypassed and INT2', INT4', TMR0', TMR1' drive the internal signals INT2, INT4, TMR0, and TMR1.

The invention described in the above detailed description is not intended to be limited to the specific form set forth herein. But on the contrary, it is intended to cover such alternatives, modifications and equivalents as can be reasonably included within the spirit and scope of the invention as defined by the appended claims.

What is claimed is:

1. An apparatus for detecting spatially displaced indicia, comprising:

a sensor having an input and an output, wherein the sensor output produces a signal transition whenever the sensor input traverses an indicia placed within a spaced plurality of indicia;

a logic unit coupled to produce an interrupt signal and a timer control signal during the signal transition, said logic unit comprising a bistable multivibrator coupled to the sensor output for filtering glitches on said sensor output from propagating onto the interrupt signal and the timer control signal; and a microcontroller having an interrupt control unit and a timer control unit for processing a first timed value and compiling a second timed value upon receiving the interrupt signal and the timer control signal from the logic unit.

2. The apparatus as recited in claim 1, wherein said sensor is an optical sensor.

3. The apparatus as recited in claim 1, wherein said sensor is an acoustic sensor.

4. The apparatus as recited in claim 1, wherein said sensor is a magnetic sensor.

5. The apparatus as recited in claim 1, wherein said spaced plurality of indicia comprises a bar code.

6. The apparatus as recited in claim 5, wherein said bar code comprises substantially white regions interspersed between substantially black regions.

7. The apparatus as recited in claim 1, wherein said logic unit further comprises:

an inverter coupled to an output of the bistable multivibrator, said inverter adapted to drive a second interrupt signal and a second timer control signal.

8. The apparatus as recited in claim 1, wherein the bistable multivibrator produces the interrupt signal and the timer control signal whenever the signal transitions to a level at least 75% greater than or 75% less than an existing voltage value depending upon whether the existing voltage value is a logic low value or a logic high value, respectively.

9. The apparatus as recited in claim 7, wherein the logic unit further comprises multiplexers controlled by an enable bit forwarded by a system configuration register within the microcontroller, wherein said multiplexers forward the interrupt and time control signals to said microcontroller in response to said sensor output in a first mode and in response to one or more other sources in a second mode, wherein the mode is determined by said enable bit.

10. The apparatus as recited in claim 1, wherein the microcontroller comprises an address and data bus interconnected between an execution unit and a memory device unit.

11. A method for determining both high and low pulse widths during each cycle of a modulated analog signal, comprising:

providing an analog signal having a first transition from a high voltage value to a low voltage value, a second transition from substantially the low voltage value to substantially the high voltage value, and a third transition from substantially the high voltage voltage to the substantially low voltage value;

initiating a first time count at a moment in which the first transition occurs;

terminating the first time count and initiating a second time count at a moment in which the second transition occurs;

terminating the second time count at a moment in which the third transition occurs;

adding the first and second time counts to determine a cycle width; and dividing the first time count by the cycle width to determine a low pulse width, and dividing the second time count by the cycle width to determine a high pulse width.

12. The method as recited in claim 11, wherein said terminating the second time count comprises interrupting a microcontroller which times the first time count.

13. The method as recited in claim 11, further comprising initiating a third time count at the moment in which the third transition occurs on a timer that is the same timer which times the first time count.

14. The method as recited in claim 11, wherein said initiating a second time count comprises activating a timer within a microcontroller when the analog signal transitions to within 25% of the high voltage value.

15. The method as recited in claim 11, including initiating a third time count at a moment in which the third transition occurs, wherein said initiating a third time count comprises activating a timer within a microcontroller when the analog signal transitions to within 25% of the low voltage value.

16. A device for computing a high pulse width within a cycle of an analog signal, comprising:

providing a power supply voltage and a ground voltage;

a sensor coupled to the power supply voltage and the ground voltage for producing an analog signal having a pair of transitions from said power supply voltage to said ground voltage and back to said power supply voltage;

a bistable multivibrator coupled to receive the analog signal and provide a first output signal triggered at the first of said pair of transitions and provide a second output signal triggered at the second of said pair of transitions; and a timer control unit coupled to said bistable multivibrator to begin timing upon receipt of said first output signal and cease timing upon receipt of said second output signal; and a processing unit coupled to said timer control unit for computing a high pulse width corresponding to the time difference between which timing has begun and when timing has ceased.

17. The device as recited in claim 16, wherein said bistable multi vibrator is triggered whenever one of said pair of transitions from said power supply voltage to said ground voltage achieves less than 25% of said ground voltage.

18. The device as recited in claim 16, wherein said bistable multi vibrator is triggered whenever one of said pair of transitions from said ground voltage to said power supply voltage achieves greater than 75% of said ground voltage.

19. The device as recited in claim 16, wherein the combination of said timer control unit and said processing unit comprise a microcontroller.

* * * * *